US007649462B2

(12) United States Patent
Ellis et al.

(10) Patent No.: US 7,649,462 B2
(45) Date of Patent: Jan. 19, 2010

(54) TRACKING SYSTEM

(75) Inventors: Peter Ellis, Edina, MN (US); David F. Fisher, Minneapolis, MN (US); Lars O. H. Svensson, Plymouth, MN (US); Robert J. Williamson, Minnetonka, MN (US); Joseph Burke, Minnetonka, MN (US)

(73) Assignee: G & K Services, Inc., Minnetonka, MN (US)

( * ) Notice: Subject to any disclaimer, the term of this patent is extended or adjusted under 35 U.S.C. 154(b) by 0 days.

(21) Appl. No.: 11/761,141

(22) Filed: Jun. 11, 2007
(Under 37 CFR 1.47)

(65) Prior Publication Data
US 2008/0119957 A1 May 22, 2008

Related U.S. Application Data

(60) Provisional application No. 60/812,531, filed on Jun. 9, 2006.

(51) Int. Cl.
*G08B 13/14* (2006.01)
(52) U.S. Cl. .................. 340/572.1; 700/224; 209/226; 209/583
(58) Field of Classification Search ... 340/572.1–572.9; 700/224; 209/226, 583
See application file for complete search history.

(56) References Cited

U.S. PATENT DOCUMENTS

| | | | | |
|---|---|---|---|---|
| 5,785,181 | A * | 7/1998 | Quartararo, Jr. ............... | 209/3.3 |
| 6,304,856 | B1 * | 10/2001 | Soga et al. ..................... | 705/28 |
| 6,695,145 | B2 * | 2/2004 | Veau .......................... | 209/3.3 |
| 6,724,308 | B2 * | 4/2004 | Nicholson ................ | 340/572.1 |
| 7,034,683 | B2 * | 4/2006 | Ghazarian ................ | 340/568.1 |
| 7,149,658 | B2 * | 12/2006 | Kadaba ....................... | 702/184 |
| 7,268,313 | B1 * | 9/2007 | Aldridge ..................... | 209/583 |
| 2003/0050874 | A1 * | 3/2003 | Sesek et al. ................... | 705/29 |
| 2005/0108076 | A1 * | 5/2005 | Carrender et al. .............. | 705/9 |
| 2005/0218218 | A1 * | 10/2005 | Koster ........................ | 235/383 |
| 2005/0289032 | A1 * | 12/2005 | Hoblit ........................ | 705/35 |
| 2006/0015408 | A1 * | 1/2006 | Brown ........................ | 705/22 |

OTHER PUBLICATIONS

International Search Report (2 pgs.).

* cited by examiner

*Primary Examiner*—Davetta W Goins
*Assistant Examiner*—Edny Labbees
(74) *Attorney, Agent, or Firm*—Brooks, Cameron & Huebsch, PLLC

(57) ABSTRACT

An improved tracking system for garments provided to a customer by a garment provider.

25 Claims, 4 Drawing Sheets

CURRENT CUSTOMER PROCESS

RSR DELIVERS CLEAN ITEMS TO ONSITE RSR OR CONDUCTS MANUAL PUTAWAY

RSR OR ONSITE RSR CONDUCTS RECEIPT AND PUTAWAY TO SHELVING/CART BY SIZE OR PUTS IN LOCKER/ON HOOK

WORKER SELF-SELECTS CLEAN ITEMS BY SIZE IF NOT PRE-ASSIGNED

WORKER DROPS SOILED ITEMS IN BIN OR RSR EXCHANGES

DATA FROM WEB APP BARCODE SCAN AVAILABLE FOR CUSTOMER REVIEW

ONSITE RSR OR 3PL MANUALLY BARCODE SCANS ALL SOILED ITEMS

RSR PICKS UP SOILED ITEMS FROM ONSITE RSR OR 3PL

TRACKING SYSTEM

RELATED APPLICATION

The present application claims the benefit of U.S. Provisional Application No. 60/312,531 filed Jun. 9, 2006, which is incorporated herein in its entirety by reference.

BACKGROUND OF THE INVENTION

Businesses provide garments and other supplies to their workers for a number of reasons. Such garments may include uniforms that are utilized to identify the worker as an employee of the company. Restaurant workers, delivery personnel and auto mechanics are a few examples of the types of employees who may be seen in uniform. The use of uniforms for employees may also contribute to the brand image of the employer by helping to present a consistent impression to the public through its employees.

Specific types of garments may also be provided in specialized circumstances. In food preparation and processing settings, an employer may provide specific guidelines for use and also for cleansing or laundering of a garment. In some cases, regulations and laws may set certain minimum guidelines as well. Clean room settings (such as for production of microelectronics) also require specialized garments in order to prevent contaminants from being introduced into the clean room setting.

The uniforms and other garments are often obtained by businesses as part of a program from a garment provider which in turn may also provide laundering and optionally sanitizing and other services. In such an arrangement, the business customer may specify to the garment provider the number and type of garments, pick up dates, turn around times and other parameters for service. The garment provider then delivers the garments to the customer for use by employees, picks up the soiled garments, processes the garments (e.g. launders them) and then returns the garments to the customer's location. Garment providers may provide for laundering and processing of items in addition to clothing and uniforms, including shop towels (such as used in a car repair facility) and floor mats (such as found in entryways and hallways) as well as other items that require laundering or processing. It should be understood that the use of the term "garment" as used is therefore non-limiting and therefore may, in proper context, be understood to include clothing such as uniform as well as towel, mats and other items that can be laundered or otherwise processed in the garment provider's facilities for the customer.

Costs in such a program are based on a number of factors including, but not limited to, the number of garments in the program, the service volume for such garments, the level of service for garments, charges for enhanced or proprietary treatment of serviced garments, charges for lost or damaged garments, and charges for new wearers entering the program. The customer wants to receive invoices that are accurate and fair and to know that what is billed has been performed to their expectations and that the service has good competitive value. Obviously, customers want to have control over how much is spent on such a program. Customers prefer billing without spikes and dislike non-productive charges i.e. loss or damage. They are also receptive towards measures to reduce non-productive cost events.

One classic dispute between a garment provider and a customer arises when a garment or other item is reported missing, whether the absence is discovered by the customer or reported to the customer by the garment provider. The dispute is whether the item has been lost within the customer's organization or during servicing by the garment provider. Service contracts usually allocate the replacement cost of the garment to whoever lost the garment. Another dispute arises when a garment is damaged and whether the damage arose from use in the customer's facility or during processing within the hands of the garment provider. These disputes can best be resolved when there is information on the location of the garment and its condition that is available to both sides allowing them to reach an agreement on the facts. However, the facts are often unavailable or obscured by a lack of records on what has been delivered, what was turned in at the customer's site, how it is used, and the condition of the garment.

The customer wants the garment provider to be responsive when exceptions or disputes arise. This means that they want agreement on the facts of the exception (e.g. damage or loss), agreement on actions with short time to correct, and visibility into the correction process i.e. tracking garments in the system. A system that would allow the customer to be able to trust the garment provider and its performance would reduce the time needed to administer the program.

Generally, industrial laundry garments are handled in random bundles when they are soiled (used and to be returned to the industrial laundry plant for cleaning). These bundles are most often managed in bulk since dealing with the garments on an individual basis is very labor intensive. After arriving at the plant the laundry is typically separated in types dependent of what should be washed together. Some separation of different delivery routes and accounts may occur too from sequential unloading of the route trucks, and by design, to separate route lots in the laundry process. Garments are normally manually separated, arranged on hangers, and hung onto a rack or conveyor system after completing the drying process.

Complete manual identification of each garment at the soil entry is normally cost prohibitive. Therefore, garment provider processes currently include identifiers on garments for manual and automatic tracking. These identifiers include human readable text and barcode information. The information on these labels is used by garment providers for automatic processing and for manual reading where automation has not been implemented. It is also understood that HF RFID tags have been tested in some industrial laundry plants.

However, these approaches result in unacceptable labor costs. For barcode implementations, readers require line of sight between reader and the identifier. For HF RFID tags, tend to require special machines to be used to separate garments in front of the reader due to their limited capability to quickly read many tags in front of the reader at the same time. It also may require manual labor to feed the separation machine.

A system that would give a garment provider the ability to automatically scan and track garments without line of sight to the label and even the ability to identify individual garments within bundles of clean or soiled garments would allow garment providers to achieve greater processing efficiencies and implement reporting and tracking protocols to provide customers with important data regarding garments in their program with a higher level of confidence in the data than can currently be achieved.

SUMMARY OF THE INVENTION

It is an object of the invention to provide a system that allows for conducting inventory and maintaining records of inventory for new garments in a garment provider's facility as well as verification procedures for ensuring the integrity of information on such systems.

It is an object of the invention to provide a system that allows for rapid assembly of elements of customer orders, for ensuring accuracy of filled order and for measuring the timing of one or more steps in the order assembly process.

It is an object of the invention to provide a system that allows an RFID tag in a garment to be identified to a particular user as a single piece or, optionally, as part of a larger set of garments.

It is an object of the invention to provide a system that allows a customer to use the information in the RFID tag in the garment to monitor and, optionally, control the movement of the wearer of the garment. It is a further object of the invention to use such a system in a food processing facility to enforce HAACP and other protocols to increase food safety. It is a further object of the invention to use such a system in a clean room facility to reduce introduction of potential contaminants into the clean room system. It is a further object of the invention to use such a system to use such a system to record multiple garment locations and multiple events and to use this data to develop verifying documents in support of compliance requirements as promulgated by government or other organizations.

It is a further object of the invention to allow a customer of the garment provider to use the information in the RFID tag in the garment to control access of the customer's employee's to one or more areas of a customer's facility.

It is a further object of the invention to use the information in the RFID tag in the garment to identify the garment when it is checked back in to a central collection (e.g. for laundering).

It is an object of the invention to provide a system that allows for highly accurate tracking of garments being delivered from a customer's possession back into the possession of the garment provider.

It is an object of the invention to provide a system that allows a garment provider to provide a customer a highly accurate series of reports regarding one or more of the following: total number garments in customer's program, location of the garments in the customer's program, status of the garment and rate of loss. The information can be used to minimize inventory, maximize garment useful life through FIFO management, manage planned wash cycles for garment obsolescence, and to use the data for establishing root causes to garment damage by matching the damaged garment, through the tag's identifier to the wearer, and further to the source of the damage in that wearer's behavior or environment.

It is an object of the invention to provide a system that allows the recording of events and locations for garments through the garment's life for verifying that garments issued are accounted for.

It is an object of the invention to provide a system that allows a data processing unit to compare the identification read from one garment with a master set of garment identifiers comprising all garments authorized to be in service, and to produce an alarm signaling that the one garment read is unauthorized, in the case the read identifier does not match any identifier in the master set, thereby preventing the use of an unauthorized garment.

It is an object of the invention to provide a system that allows using a reader to locate one or more garments by traversing a large set of garments with the reader and determining the location of the garment by a garment read event. When the garment read event occurs it becomes known that the garment is located within the reader's read range location at that time.

It is an object of the invention to provide a system to develop a garment location map in a garment storage and/or processing facility (including storage within a processing facility). By attaching RFID tags to predetermined fixed locations within the garment storage facility these locations can be used to establish the location of a reader traversing the whole or part of the garment storage facility. When the reader is traversing the garment storage facility it will read garment tags and location specific tags sequentially as the reader traverses the facility and tags enter the reader's read range. The resulting sequence of garment and location specific identifiers thus developed can be used to establish the location of each garment read described as between two or several location specific tag identifiers.

It is an object of this invention to provide a system that can be used for processing of data for garments that have been sold directly to the customer and that are laundered and maintained by the customer or a third party.

It is an object of this invention to provide a system that automates the RFID tagging of large numbers of garments for enabling existing garments to become usable within the invention RFID based system in general.

It is an object of this invention to provide a system that can be used for reading and validating the location of garments and other items on a truck.

It is an object of this invention to provide a system that includes the capability to selectively, as intended by the operator or as determined by the system, either read many tags from a longer distance (i.e. 10 ft) or to read a smaller number of tags (including single tags) at a smaller distance, discriminating this smaller number set of tags from the large number set of tags also when the larger set is in the vicinity (outside 1 ft, within 20 ft) of the smaller number of tags. This capability can be used for uniquely identifying garments in a number of settings including garments located close together, garments moving at high speed through a plant, and garments moving through an automatic sorting process system such as found in an industrial laundry or dry cleaning setting.

It is an object of this invention to provide a tag system that includes a tag encapsulation that is suitable to withstand the rigors of handling, use, washing, drying and other processing within the industrial laundry process, home washing, and dry cleaning.

DETAILED DESCRIPTION OF THE INVENTION

Figure 1:
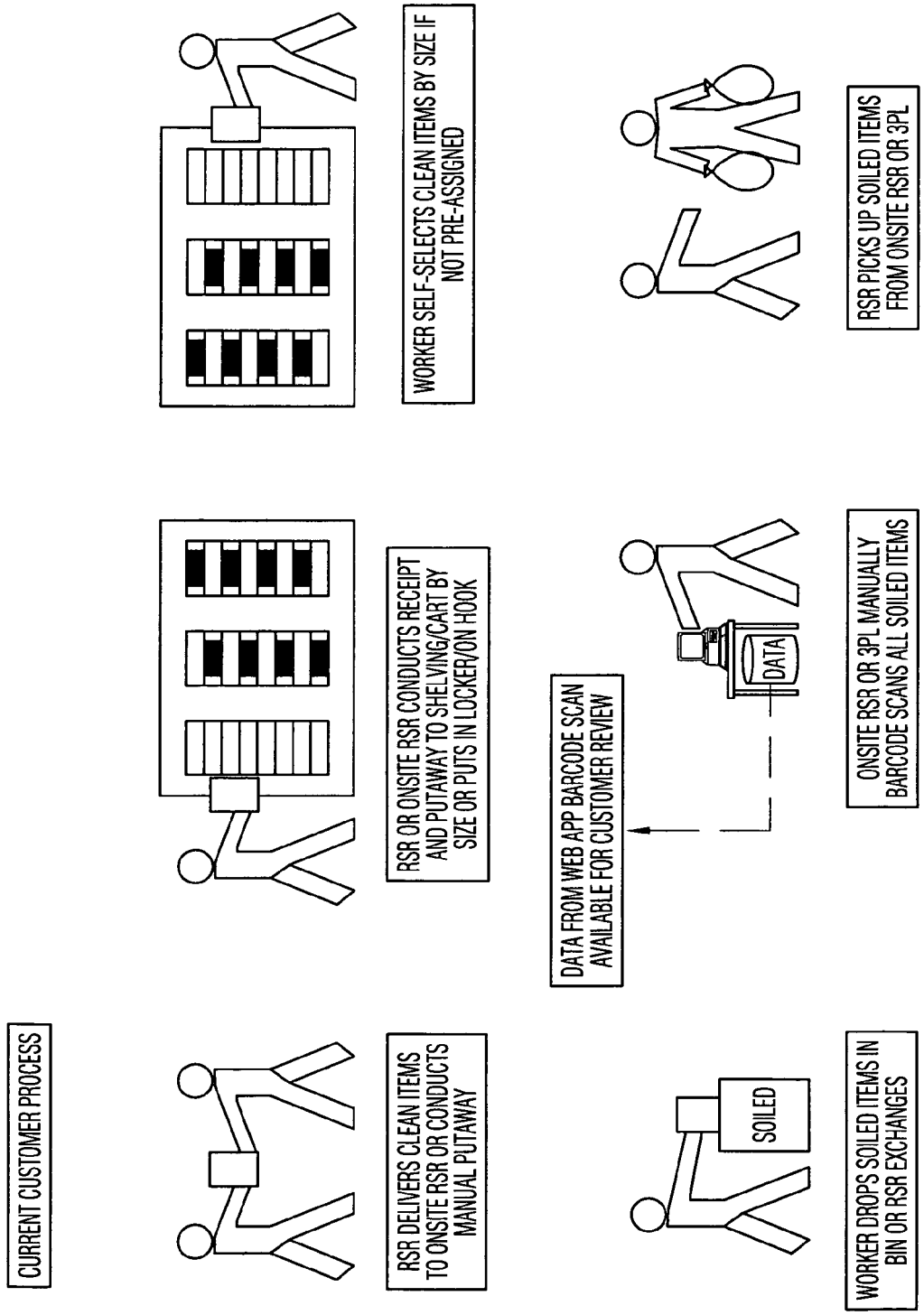
FIG. 1 shows a flow chart with steps in a typical customer garment process.
Figure 2:
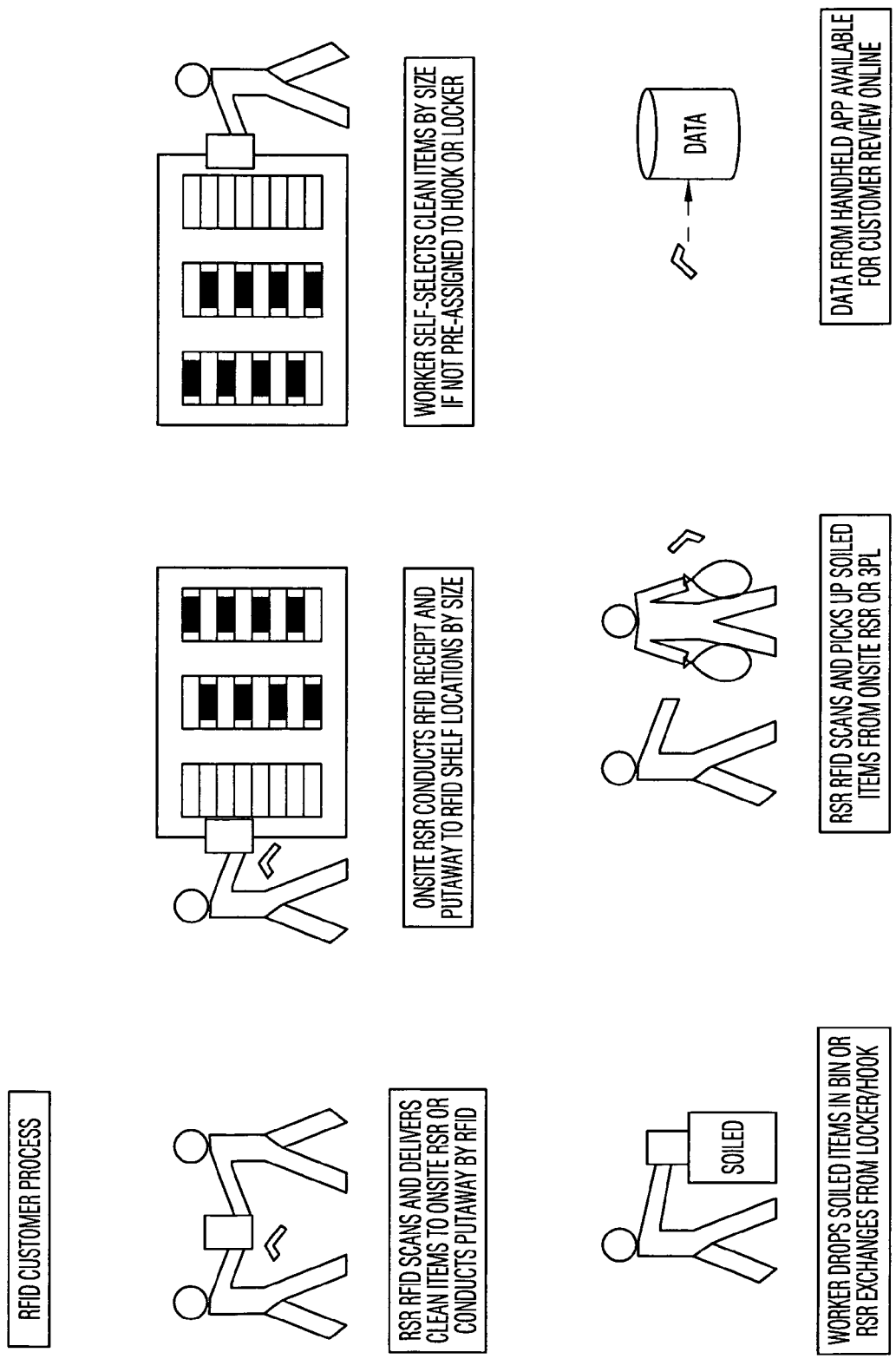
FIG. 2 shows a flow chart of the process of FIG. 1 with a system of the present invention implemented.
Figure 3:
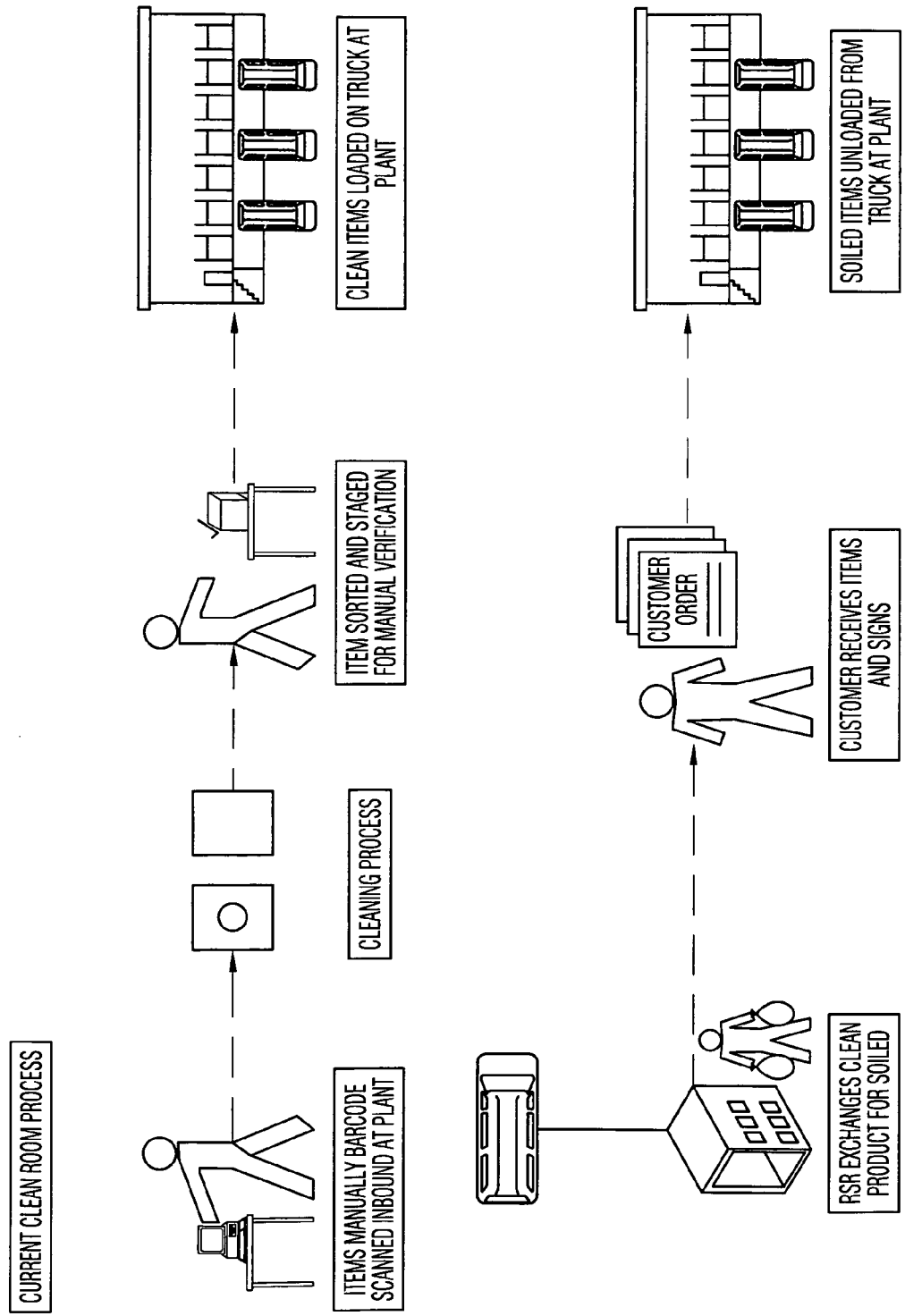
FIG. 3 shows a flow chart with steps in a typical customer process for clean room garments.
Figure 4:
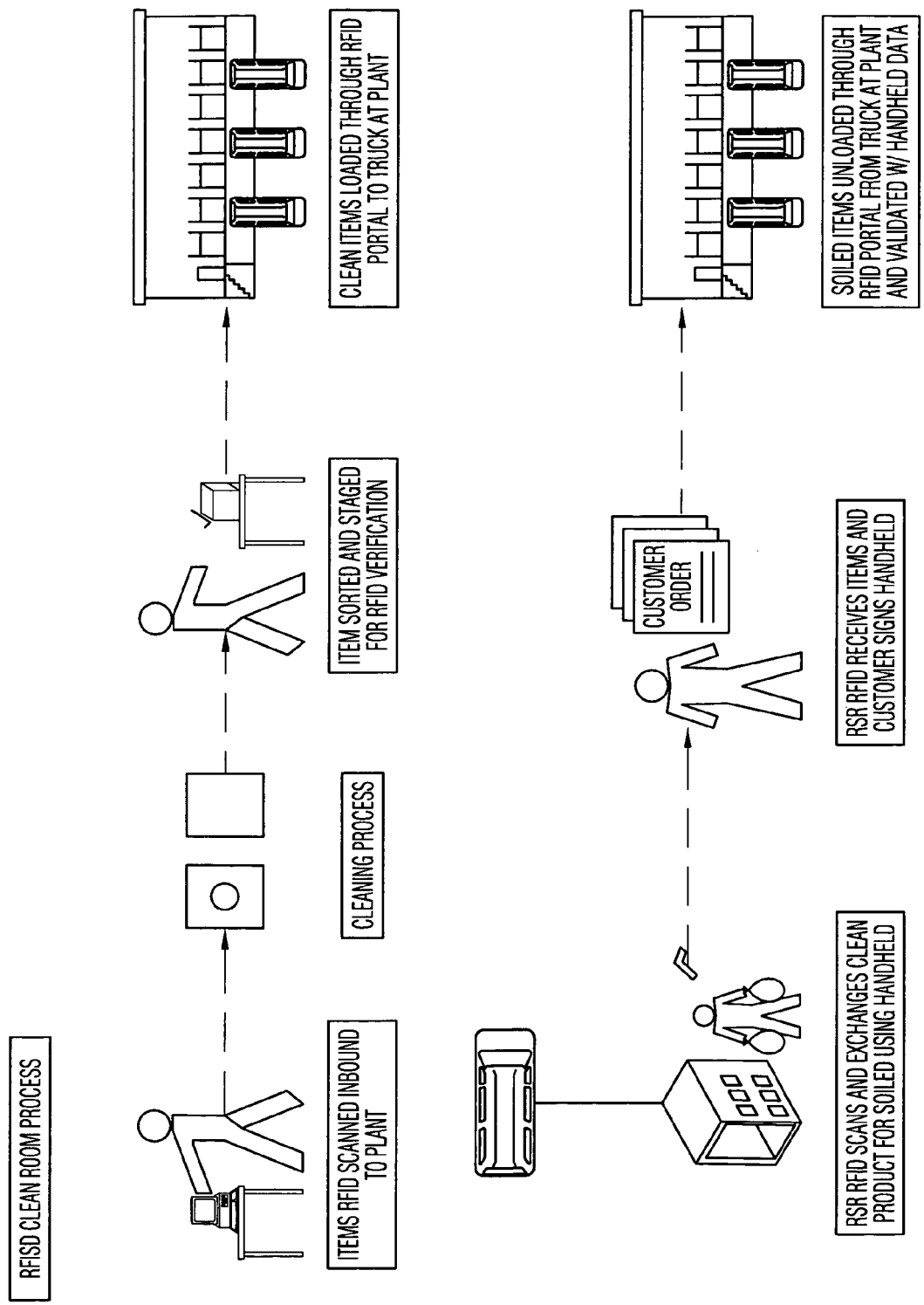
FIG. 4 shows a flow chart of the process of FIG. 3 with a system of the present invention implemented

The system described herein utilizes RFID tags and tag readers capable of reading information on the tags as well as writing information to the tag. The system also includes data processing capability that allows for highly accurate tracking by a garment provider of garments and other items through the use and processing cycle of such items. The garment provider may also provide varying levels of this tracking information to its customers depending, for example, on the customer's desire for such information and in part on the customer's ability to utilize and store such information. Garments may be tracked beginning at the arrival of the garments in the garment provider's facility, through delivery to the customer, upon pick-up from the customer site and upon arrival of the garments back at the garment provider site. Additionally, garments may be tracked during the process of initial order fulfillment, upon loading of an order or parts of an order onto a vehicle for delivery, at the time the vehicle leaves the garment provider's facility, at the time of arrival at a customer's facility, upon unloading of the order or part of the order at the customer's facility, and upon delivery of the garments within the customer's facility by the garment provider or by an employee of the customer. Information could also be collected by the garment provider or the customer regarding the status of garments or other items while residing at the customer's facility for use in monitoring or other activities such as identification of non-personalized garments to a wearer, tracking the position of the garment or other item through the customer's facility, utilization of information on the RFID tag of one or more garments assigned to an employee to monitor or control access to various locations in the customer's facility and to monitor turn-in compliance by employees for garments issued to them.

RFID Tags

RFID tags may be GEN 1 (UHF) tags in certain applications, however UHF RFID tags operating at 860-960 MHz (within a subset of this range mandated by applicable national laws or regulations) and utilizing GEN2 or later version specifications may be used to allow for faster reading of tags, to allow for storage of more information relating to the identity of the garment or other item, the status of the item and users of the item, and more importantly to allow for greater range of reading.

RFID tags useful in the invention will typically comprise an RFID chip (typically 1-2 mm in size), an antenna, a chip saddle or other connection between the chip and the antenna, and a substrate into which the chip, saddle, and antenna are fixed. This assembly is called an inlay. The antenna may be constructed from numerous different materials, including but not limited to etched metal, conductive ink, conductive rubber or wire. The RFID tags utilized in the system need not contain any internal power source, but derive power needed to activate the memory and transmission functions from the signal sent by a reader (i.e. passive tags) and received by the antenna connected to the RFID chip.

RFID tags utilized in the system must be able to withstand the harsh processing conditions encountered in an industrial laundering process as well as other conditions found in a customer facility. Typically, RFID tags by themselves are unable to withstand the harsh conditions of a laundering process. Thus, the inlay may be contained within a protective layer to create an RFID tag. The protective layer will stand up to the conditions under which a garment is utilized and laundered and may have features (such as holes or structures) that allow for secure placement of the tag on a garment. The protective layer may be a polymer coating, such as a polyester, into which the inlay of the RFID tag is laminated. It should be noted, however, that some lamination methods or materials may not provide a protective coating that is suitable for garments that are laundered on an industrial basis. Laminations may fail after repeated stress placed on the tag during a laundering process, thus allowing water and other chemicals (e.g. detergents) access to the RFID inlay.

Therefore, the protective layer may also be provided by encapsulating the RFID inlay using an injection molding procedure or a die casting procedure. Polymeric materials that may be useful in these procedures include thermoplastic elastomers such as a SANTOPRENE® elastomer (Advanced Elastomer Systems; Akron, Ohio) or ELASTOCENE. Flexible RFID tags may also be subjected to multiple bending events during processing and/or use, especially during a cycle of industrial laundering. Thus, the connections between the antenna and the chip containing the electronics of the RFID tag should be constructed in a manner that accommodates this bending. For example, the area of connection between the antenna and the chip may be strengthened or stabilized. There may be a stronger material used in preparation of the inlay in the region between the chip and the antenna. Additionally, there may be one or more strengthening members (such as a rib) added to the inlay in the region of the saddle function between the chip and the antenna). As well, additional material(s) may be added during encapsulation in the region of the saddle. The material may be a viscous resin added in a metered amount onto exterior of the tag after encapsulation in the saddle region. The material would be relatively inflexible in the region of the saddle. This added resin may also be cured to allow it to be increasingly more flexible at distances away from the saddle. The result is a flattened drop that is thick enough to appear rigid in the chip/saddle area and that is gradually thinner and more flexible further from the chip/saddle area thereby adapting the rigidity from full chip-saddle protection to full antenna flexibility as it becomes thinner further from the center of the drop.

In order to minimize fracture of antenna components in an encapsulated RFID tag, conductive ink may be combined with electrically conductive fiber in a way that allows the fiber to continue to provide a conductive "bridge" in the event of fracture of conductive ink. Another possible solution is to replace the antenna materials previously used with conductive rubber material i.e. such that is used in external cell phone antennas. This conductive rubber may be stamped or cutout and then assembled onto an inlay. In one embodiment, the RFID chip has external connections that may be pressed against the conductive rubber, thus assuring a "flexible" connection. This is one example of a connection between the antenna and the chip that may be constructed in a way that allows for flexibility without substantial loss of conductivity between the chip and the antenna even after bending numerous times. Some damping of the RF signal may be experienced due to the fact that the conductive rubber has higher impedance than metal but this damping may be mitigated by the possibility to use a larger antenna due at least in part to the flexibility of this material.

In another embodiment, the encapsulation may be made of conductive rubberized material and thereby act directly as antenna. Normally, it is desirable to have an antenna that is made up of two separate parts thereby creating a dipole. It can be envisioned that two conductive encapsulation parts are separated in the region of the RFID chip by a portion of encapsulation that is non-conductive. One benefit with this approach is to achieve one continuous material with respect to stress related parameters but to create a discontinuity in electric conduction thereby providing the desired dipole structure.

The tag may be situated on a garment or other item in a way that is innocuous to the user and at a minimum should not interfere with the user's ability to perform the tasks assigned to them. The tag can have a form and character that prevents it from causing discomfort to the garment wearer or user. Optionally, the RFID tag will have additional identifying information for the tag itself located on an outside surface such as in the form of a visually identifiable serial number or a barcode. Optionally, the tag can have the capability to be read together with many other tags at a large distance (i.e. 20 ft), also called far field, or to be read as a single item and separate from other tags located close by (i.e. 1 ft), also called near field reading.

Size and flexibility requirements for the RFID tag are driven by the need to make the tag comfortable and unobtrusive for the wearer of the tagged garment. These requirements are in a trade-off relationship with other requirements for read range, read speed, and industrial laundry process survival. Read range and speed are improved with a bigger tag since it is possible to get a better RF coupling with a larger antenna. Generally, optimized tags with no strict size restriction are about 4×1 inches with the antennas folded back to fit within the 4×1 inch envelope. The unfolded dipole antenna is in this case about 7-9 inches. However, the desired size for an encapsulated RFID tag useful in the invention and having an antenna capable of supporting a practical read range is about 2×1 inches.

Other configurations of RFID tags may also be used. For example, the antenna for the tag may be in the form of a conductive thread such as an encapsulated conductive thread. The thread can be of a flexible material that optionally has elastic and/or expansion properties similar to the encapsulation thereby minimizing stresses in the bond between thread and encapsulation. The antenna should ideally be of a length close to one-fourth of the UHF wavelength utilized by the RFID chip to get best RF coupling. A thread antenna can be unobtrusively hidden inside a folded seam, waistband, or collar. This way of integrating the antenna into a garment or other item allows the use of an antenna having a length (e.g. 6-12 inches) greater than that in an encapsulated tag. The connection between the chip and the antenna must be rugged enough to withstand at least some level of tension as would be placed on the antenna components during wear and or use.

In construction of an RFID tag using conductive thread, it may be useful to use an RFID chip capsule to house the RFID chip and to surround and protect the connection between the RFID chip and the antenna. Examples of connections that may be sheltered include adhesive connections and crimping of a metal or other flexible tab on the RFID chip or the saddle around the antenna material.

Another construction that may be useful in preparation of an RFID tag is to construct a thin, flexible rod having two segments capable of acting as an antenna for the RFID tag separated by a non-conductive element. The non-conductive element would be sized to be slightly less than the width of the RFID chip. A slot is defined by the non-conductive element that provides for access between the conductive elements. An RFID chip with elements that can interact with the conductive elements and provide an electrical connection therebetween may then be inserted into the slot allowing electrical communication between the RFID chip and both conductive elements. The slot may then be filled in with additional non-conductive material. Additionally, the construction may be encapsulated (e.g. dipped) in an additional resin or other coating to further protect the RFID chip.

Yet another construction may employ conductive elements connected (e.g. fused) to side of an RFID tag. In this construction, the RFID chip would have electrical connections on each of the top and bottom of the chip. These connections would in turn be connected to the conductive elements as a result of the connection to the RFID chip. This construction may then be encapsulated to protect the RFID chip.

It should also be noted that the connection between the RFID chip and the antenna components may not need to be a direct electrical connection. Rather, the communication between the RFID chip and the antenna components may be inductive or capacitve. Use of such "non-contact" communications allows for construction of more rugged flexible tags because the potentially sensitive direct electrical connections are eliminated.

RFID tags may be placed on garments or other items already in use within a garment provider's or a customer's system. Thus, customers who retain the garment provider to service their existing inventory of garments and other items may obtain the benefits of this system as well. The system for placement of the RFID tags on existing inventories of garments must be rapid and reliable in order to minimize expense of conversion to the system of the present invention.

RFID tags that are not adapted to withstand the processing conducted by the garment provider may nevertheless be used in the supply chain prior to delivery to a customer or even up to the point that the garment enters into a service cycle. Garments manufactured for the garment provider may be tagged with a temporary (e.g. disposable or non-rugged) RFID tag for tracking of the garment from the manufacturer to the delivery of the garment to the garment provider and potentially up to the point of delivery to the customer. The temporary tag may be written with information regarding the source of a garment, with the type of garment, with the identity of the customer(s) for whom the garment is intended, and other information that may not be as relevant during the useful life of the garment. The temporary tag may be affixed in a manner that allows it to be separated easily from the garment and without damage to garment. It may be beneficial to have the temporary RFID tags operating at a different frequency than the rugged tags.

Temporary tags (having RFID capability, barcode or other information) may be used in the supply chain from the manufacturer to the garment provider. The garment provider may use the temporary tags for inventory purposes and for tracking of garments and other items received at a main receiving facility and during distribution to regional and local facilities that are in proximity to a customer. For example, the garment provider may use the temporary tag information for directing the delivery of portions of a bulk order to a regional or locality based on the identity of the customer for whom the garment is intended. The temporary tags may also remain affixed to the garment up to the point of delivery to a customer in a situation where the garment provider is providing a direct sale of the garments to the customer. The tags may be used in this context, for example, to verify delivery of complete orders of garments and/or other items.

Order Fulfillment

A system for delivery of non-personalized garments and other items would typically begin with reception of an initial order from a customer. The order could include various portions of a uniform or of complete sets of garments to be used together by an employee. The garments may be those that are worn over a worker's own clothing or that are donned at the customer's facility in place of a worker's own clothing.

The garment provider assembles the various parts of the order for delivery to the customer either from new products obtained from a third party supplier or from existing inventory of new products. In addition, in some circumstances, customers may be given the option to fill orders from the garment provider's inventory of previously used products. Previously used products are often supplied at a discount relative to new products.

Some or all of the individual garments may be tagged with an RFID tag as described hereinabove. Tagged garments may be individually scanned to ensure fulfillment of the order and optionally to associate the particular garment as a part of a particular order. In one embodiment, as a garment is brought into a staging area the garment may be passively scanned by a reader at or near the entrance to the staging area.

Garments or other items that are not individually tagged (e.g. shop towels or small, low value garments) may be aggregated together such as in a bag, box, tote, or other container that is tagged in order to ensure fulfillment of the order. Where individually tagged garments are placed in larger containers for delivery, the individual tags may be associated with an RFID tag on the container at the time they are placed in the larger container.

Garments that are personalized to the user (i.e. the customer's employee) may be collected as a set and various physically identifying markers (e.g. patches, ribbons, labels) may be applied to the garment. The RFID tags that are part of the collection specific to a user may also be programmed to identifying the garment as "belonging" to the user. Responsibility for the garment, including condition of the garment and presentation for regular cycling of the garment for processing at the garment provider's facility can be enforced and compliance with customer policies tracked by the garment provider, the customer or both.

The order may be assembled and loaded onto a vehicle for delivery to the customer in parts. As each part is loaded it may be scanned using a mobile or static reader to obtain information from RFID tags present in that part of the order. The various information may be assembled in the mobile reader or a central information point and compared to the order to report back on parts of the order that are still required or that the order has been completed. Once an order is assembled in the garment provider facility or in the delivery vehicle it may be scanned and the information compared to the customer order to ensure that the order is complete. At an appropriate time, this information may in turn be conveyed to the customer to ensure that the assembled order and the customer's expectations for the order are in agreement.

Receipt at Customer's Facility

Garments are off loaded from the delivery vehicle into the customer's facility. Multiple readings may be utilized during the off loading process including a scan of the delivery vehicle prior to and after off-loading to verify the presence of the order and the removal from the delivery vehicle. The garment provider delivery personnel may also scan off-loaded garments to verify delivery and also to receive further delivery information directing the garments to the various receiving areas designated by the customer. For example, in a food processing facility, certain garments may be designated for receipt and use in raw food processing areas and certain garments may be designated for receipt and use in finished food or packaging areas. Additionally, orders to a customer facility may be further broken down for delivery of garments to particular employees. For example, garments assigned to a particular employee may be delivered to a locker assigned to that employee.

The system has the capability to allow the customer to view and if desired to print a receipt or other report at the customer's site including all items scanned by the system during the time the time removed from the vehicle and delivered during a route site visit by an RSR. The system may also have the capability to capture the customer's signature or other mark indicating acknowledging that a report has been received and/or reviewed by the customer.

The system has the capability to scan only one set of garments while being worn by a wearer and successfully identify all garments on the wearer. The system may also be configured to receive identifier information from an external system that identifies the wearer of the garment. Thus, at a site where garments are issued to a wearer for multiple uses (e.g. a personalized or a tailored uniform) the system can ensure that all garments being scanned are properly worn by the wearer. The system may also be configured with the capability to associate the wearer's identity with the collection of the garments on the wearer at the time of identification. This marrying of garments to the wearer may be performed with no or minimal extra labor. For example, the system may utilize a station where only one wearer at a time is scanned and in which the user provides a personal identification at a previously installed identification position (i.e. at an access control point or even the point of egress from a donning area within the customer's facility). The identity information provided by the wearer at the identification point may then be linked or associated with the information obtained from the tags present on the garments worn at the time of identification. Such information transfer could be initiated by keyboard input by the wearer or input from a security identification device into the system.

Often a customer site will utilize mats at building entrances or areas that may present slip and fall hazards. Mats are often carpeted on one side and rubberized or otherwise non-slip on the other side. Garment providers often provide mats on a rental basis and periodically replace the mats, returning the soiled mats to the facility for cleaning. Mats may be provided in standard configurations and colors by the garment provider. Mats may also be custom manufactured to meet the specific requirements of a customer. The cost of the mats, particularly custom mats, is substantial and keeping track of the location A system of RFID tags may be used to monitor the placement of mats within a customer's location and the location of mats within the garment provider's delivery and.

An RFID tag may be fixed to an agreed mat placement location permanently or semi-permanently (e.g. with adhesive, tape, or similar method). When a service representative places a mat in the agreed placement location, a scanner may be used to scan both the RFID tag inside the mat and the RFID tag signifying the agreed placement location. The scanner records identifying information from the two tags to associate the specific mat with the specific agreed placement location. Optionally, the scanner may log the time and date of the placement, the identity of the service representative and other data. An entry in the placement service record for the customer or the customer's site may then be created from this data. This placement service record can be made basis for transfer of custody of the mat from the service representative to the customer. After an agreed upon time, the service representative can scan each mat that is removed from the agreed placement locations for processing, thereby signifying return of custody to the mat rental company. This type of custody tracking greatly minimizes disputes over custody of any lost mats.

RFID can similarly be used within the customer's environment to record service items by scanning local RFID tags placed within or close by each service item. Such service items may be mats, soap, shop towels, bathroom tissue and more. RFID can be used in the field to validate personnel service activities (using a principle similar to that of a night watch man's key). This capability can be used for quality of service tracking and for charges for incremental services Use of the System While an Employee is at Work In situations where employees provide services to businesses or to the general public and where a uniform provided by the employer confirms that the wearer represents the employer, the employer may desire to obtain increased opportunity to track, secure and validate uniform garments to prevent a third party from impersonating a legitimate wearer by donning a lost or stolen garment. Employers may find such increased opportunities particularly important in the case of professional uniforms, since the uniform itself implies that the wearer possesses a certain position or authority. Unfortunately, the implication of position or authority from a garment (for example, a security services or a law enforcement uniform) might be used surreptitiously by a person or persons in the process of committing a criminal or fraudulent act. Analogous relationships exist within medical care and elder care as well as in many other private, commercial, and public environments.

The system of the invention can be used to provide control over such uniforms and to provide for notifications or alarms where garments are not accounted for within certain parameters. For example, garments may be selected by the employer for delivery to the employer's facility. The garments may be pre-identified to the employee, such as at the garment provider's facility. The employer may provide order information as well as certain employee specific information that will allow tracking of the garment between the garment provider, the employer and the employee once the information is associated with or embedded into the RFID tag. As the garments are delivered, the employer's representative may confirm receipt and direct the placement of the garments in the employer's facility. The garments may be delivered directly to an employee-specific location (such as a locker) or the garment may be issued directly to the employee. This delivery may be confirmed by use of one or more readers. In one alternative, an employee may be required to present additional identification to show that the garments worn by the employee match to a separately issued identification card or to another identification (such as an employee-specific password) in order to proceed out of the employer's facility.

In certain service provider situations, it is envisioned that the system may provide for communication between low cost readers in residences and businesses connected through a communication system to a remotely located identity data services system in order to validate that a contractor or visitor has properly authorized credentials. The system would operate by reading one or more RFID tags in a uniform and confirming the tag identity with the data services system. The data services system could in turn communicate with the employer's network system in order to confirm that a specific employee or contractor was directed toward a particular location.

The system may also be used to track and even control movement of a wearer within the customer facility. For example, a particular wearer may be denied access to certain areas of a facility (e.g. because the wearer lacks the training to be in a certain area or the area contains sensitive, trade secret information for which the customer desires to restrict access). Also, the wearer may be qualified to enter certain areas, but could take one or more actions that would disqualify the worker from entry into the area, at least with the garments being worn by the wearer at that time.

For example, in a food processing facility, company practices and policies may dictate that workers in the raw food processing areas be denied access to finished food or packaging areas. This restriction may even apply to such workers where they have not yet entered the raw food processing area. Moreover, a worker normally assigned to the finished food or packaging area may enter the raw food processing area, but may not then reenter the finished food or packaging area. Such restrictions may also be specified in the HAACP plan for a given facility.

The system of the invention may keep track of such a worker's movements within the facility and deny entry into one or more areas within the facility by physically locking out the wearer from the proscribed area, by sounding an alarm at the entrance to the proscribed area and/or reporting the attempted entry into the proscribed area to the proper level of management within the customer organization to address the matter.

Similarly, in clean room settings, a wearer may don a set of clean room garments and marry up his/her personal identification information to one or more of the RFID tags associated with the garments. When the wearer attempts to enter the clean room facility, the system may check to ensure the wearer is in possession of all the required garments. The system may also check to ensure that the wearer is properly granted entry into the clean room environment based on the wearer's job description and level of training. The system may also check to ensure that one or more of the garments have not left the staging area for entry into the clean room, thereby disqualifying an otherwise qualified wearer from entering into the clean room.

Similarly, a garment may be married up to a location by reading the garment RFID tag and a dedicated tag identifying the location. Examples are locations such as lockers, hangers, rails, shelves, totes, carts and other locations. This marrying up of a garment with a location may be used to validate actions, such as the fact that services have been performed. Examples may be that a garment has been delivered to the right location, accessed by the wearer, or that a dispenser such as a shop towel or soap dispenser has been serviced (i.e. filled).

The system can include capabilities that allow the system to read garments at a location and a time and to measure the duration or frequency of use of the garment. This information can be used for certification of garment parameters specified for use in a particular process. Examples may include the number of times a clean room garment can be donned without return to the garment provider for processing, the number of work shifts or work hours a food processing garment can be used before return to the garment provider for processing. The system can also be configured to provide reminders to an employee regarding return of garments for processing. For example, uniforms used by employees in provision of service directly to customers may be placed on a regular schedule for processing. If an employee has not returned the garment for processing according to the schedule for the garment, the system at a customer's facility may generate notices (such as electronic mail messages) to the employee or to the employee's supervisor. The system may also deter or prevent the employee from accessing certain areas in the customer's facility if an employee is wearing a garment that should not be in use.

Return of Garments to Garment Provider Facility

Garments may be returned to the garment provider in a number of ways. The garments may be placed in a common receptacle with garments from other employees of the customer. In the present system, the receptacle may have a reader to interrogate the RFID tag associated with the garment to obtain information regarding the owner. Once the employee has finished with the garment, the garment is placed in the receptacle and the reader interrogates the tag. Information, such as the identity of the employee, the date the garment is due for servicing and whether the garment was associated with other garments (e.g. sport coat and slacks; clean room uniform) may be collected and reported to the customer's information systems. In certain cases, a receipt may be issued to the employee, especially in the case of higher value garments. Information may also be obtained in regard to garments in a receptacle by use of a handheld RFID reader. In such a system, the customer may desire to scan the contents of the receptacle prior to pick-up by the garment provider.

The customer can use the information to track usage by employees such as in a situation where an employee is using multiple garments in a single day. The customer can also use the information to verify the garments collected by the garment provider for processing. For example, the garment provider may independently collect information from the RFID tags on the garments upon collection from the customer who can in turn compare the report from the garment provider to the results by the customer. In the case of a discrepancy, a garment provider may collect information on the collected garments again to ensure that all tags are read or could manually inspect the contents of the collected garments to determine whether the garment is physically present.

Processing at Garment Provider Facility

Garments are returned to the garment provider facility, typically in a vehicle owned or controlled (e.g. leased) to the garment provider and driven by a garment provider employee or contractor. Once the vehicle arrives at the garment provider facility, garments are off-loaded into a receiving area. The contents of the vehicle may be scanned prior to off-loading to set a baseline for processing of the garments. Garments may also be scanned as they are removed from the vehicle. Typically, such scanning would be done on a collection (e.g. a bag) of garments prior to routing within the facility. Some or all of the results of the scanning may also be reported back to the customer in addition to the report generated at pick-up or in place of such a report.

Information from the scanned loads of incoming soiled garments have that have arrived at the plant and been sorted and individually scanned can be assembled into a data set that completely describes the number of garments by type, by process, and by labor required to process. This information can then be used to allocate labor for processing in each sequential step in the laundering and further processing thereby maximizing labor efficiencies and avoid periods of inactivity for on-site labor resources. The laundry parameters for the soiled garments in the plant can also be used for planning and scheduling to ensure availability of chemicals (detergent, fabric softener, anti-microbial) and other supplies. Information obtained from scanning of incoming garments may also be used in other aspects of plant planning including processing sequence and allocation of water, temperature, equipment depending on the required mechanical action for processing In one example the items received at the facility may include the following categories of products that would need to be routed within the facility:

1. Returned soiled garments
2. Returned clean garments
3. Damaged garments
4. Destroyed garments
5. Soiled samples
6. Clean samples
7. Soiled repair
8. Clean repair
9. Soiled return mats
10. Clean return mats
11. Soiled return shop towels
12. Clean return shop towels Each of the items in a return load can be categorized and directed accordingly within the facility. Optionally, the status of the item may be stored in the RFID tag for the item. Damaged items can be evaluated for continued use in the customer's program or may be decommissioned from the program. Repair items may be attended to during the processing at the facility and evaluated for further use in the customer's program. The status of a damaged or a repair item may be entered into the system and this status information may be entered into the memory of the RFID tag as well. Costs for damaged items, for repairs to repair items, for destroyed items and for decommissioned items are accounted for and appropriate charges made against the customer's account. The RFID tag in any decommissioned or destroyed items may be removed from the item for reuse. Such reuse of the tag would require reprogramming of information and identification of the tag to a new item.

As each item is processed through the facility, information may be collected in a central processing area in the facility regarding the status of the item. For example, the processing of a set of garments may be followed through the facility from the time of arrival in the plant to the exit of the item from the facility back to the customer. In addition, the progress of items through special processing steps (e.g. anti-microbial laundering procedures, wearer specific pressing of garments) may be tracked for verification purposes, and for optimizing the laundry process to minimize the use of resources (such as labor, chemicals, and energy), to minimize waste water produced by the process, and to maximize the use of productive capacity. For items that have been repaired, the progress of these items through processing and reunion with other items from the same initial load may be tracked and confirmed. For items that have been damaged beyond repair or are classified as destroyed, the garment provider may then direct the replacement of such items using new items. Replacement of damaged or destroyed items may also be accomplished using items from inventory of previously decommissioned products where the contract with the customer allows for such replacement. Reprogramming of the RFID tag for these new and previously decommissioned products can be accomplished to identify the item for use in the customer's program.

Garments and other items may be tracked by use of handheld RFID readers that can report some or all of the information on a tag to a central information collection point in real time or when the unit is docked to a hardwired connection. Static ports may also be used in a facility to record and/or report the movement of garments from one area of the facility to another. Tube type or other antenna configurations may be used as well. These types of antenna may be useful when conditions for reading are less than optimal, such as when a bundle of garments enters a facility, when a bundle or pile of wet garments is presented for reading, or for large numbers of garments. Static readers capable of obtaining information on tags within an entire room may be used. Mobile readers that traverse all or a portion of a facility may also be used. These readers may interrogate RFID tags in various regions of the facility and provide location and other information to a central information collection point. The location of these mobile readers may be determined by the reader itself by utilizing static location information points, such as a bar code or an RFID tag located at the entry point to a particular location in the facility.

Garment Life Cycle Management

Garment life cycle tracking can be used to validate that only garments that have been duly reviewed and authorized are used within the garment use process and that all authorized garments are regularly accounted for. Information from all reading stations and all read events envisioned in the system can be aggregated and evaluated over the garment's life, from manufacturing to final disposal. Valuable information can be extracted from this data for benchmarking, compliance verification, quality audit, business performance evaluation, cost allocation, and many other important business objectives for both the customer and the garment provider.

We claim:

1. A method for tracking garments, comprising:
    retrieving garments from one or more customer facilities;
    scanning at the one or more customer facilities for an RFID tag associated with the retrieved garments to obtain garment identifying information;
    delivering the retrieved garments to a garment provider facility;
    laundering the retrieved garment at the garment provider facility using RFID tag to track the retrieved garments through a laundering process;
    delivering laundered garments to a customer that has employees as part of a program to provide the customer with laundered garments into one or more customer facilities;
    scanning at the one or more customer facilities for the RFID tag associated with the laundered garments to obtain garment identifying information; and
    associating the garment identifying information with delivery information for the laundered garments, wherein the delivery information includes confirmation of delivery of the laundered garments into the one or more customer facilities.

2. The method of claim 1, further comprising verifying presence of an order that includes the laundered garments by scanning a delivery vehicle for the RFID tag prior to off-loading the laundered garments.

3. The method of claim 2, further comprising:
    comparing the garment identifying information from the retrieved garments to delivery information for laundered garments previously delivered to the customer.

4. The method of claim 2, further comprising verifying removal of the order from the delivery vehicle by scanning the delivery vehicle for the RFID tag after off-loading the laundered garments.

5. The method of claim 1, further comprising:
    combining garment identifying information from retrieved garments with garment identifying information from other retrieved garments.

6. The method of claim 5, further comprising processing the retrieved garments in the garment provider facility.

7. The method of claim 6, wherein processing includes storage of the laundered garments.

8. The method of claim 6, further comprising scanning an RFID tag associated with a retrieved garment during the laundering process, and determining the status of the garment in the laundering process.

9. The method of claim 8, wherein determining the status of the retrieved garment is determined by associating the location of the scanning with the presence of the retrieved garment in that location.

10. The method of claim 9, further comprising using at least garment identifying information and status information from a laundered garment to combine laundered garments for delivery to a customer.

11. The method of claim 2, further comprising using garment identifying information from the retrieved garments to indentify the location to which a laundered garment should be delivered.

12. The method of claim 1, wherein the garment indentifying information and the delivery information is provided to the customer.

13. The method of claim 12, wherein the delivery information is the assignment of the laundered garment to a particular employee of the customer.

14. The method of claim 13, wherein the delivery information is used by the customer to monitor movement of the laundered garment within the customer facility.

15. The method of claim 14, wherein the delivery information is is used by the customer to restrict movement of the laundered garment into one or more areas of the customer's facility.

16. The method of claim 1, wherein garment identifying information is obtained by scanning multiple garments in a single step of scanning.

17. The method of claim 1, further comprising using garment identifying information to provide the customer with additional information selected from the group consisting of the total number garments in customer's program, location of the garments in the customer's program, status of a garment and rate of loss of garments in the program.

18. The method of claim 12, wherein the laundered garment is used in a clean room setting.

19. The method of claim 12, wherein the laundered garment is used in a food preparation setting.

20. The method of claim 1, wherein the laundered garment is part of a set of garments to be used concurrently.

21. The method claim 1, wherein the laundered garment is a mat and the location information is the location in which the mat is deployed in a customer facility.

22. The method of claim 2, wherein garment indentifying information is obtained by the customer for garments to be retrieved prior to retrieval from the customer facility.

23. The method claim 22, further comprising comparing garment identifying information obtained by the customer for garments to be retrieved with the garment identifying information from the retrieved garments, the delivery information for garments previously delivered to the customer or both.

24. A method of tracking a garment, comprising:
    associating an RFID tag with the garment as garment identifying information;
    retrieving the garment from one or more customer facilities;
    scanning at the one or more customer facilities for the RFID tag associated with the retrieved garment to obtain the garment identifying information;
    delivering the retrieved garment to a garment provider facility;
    cleaning the retrieved garment at the garment provider facility using the RFID tag to track the retrieved garment through a cleaning process;
    scanning for the RFID tag at the garment provider facility prior to delivery;
    delivering the cleaned garment from the garment provider facility into a facility of a customer that has employees; and
    scanning the RFID tag at the customer facility to associate the garment identifying information with receipt at the customer facility and to receive further delivery information directing cleaned garments to a receiving area designated by the customer.

25. A garment tracking system, comprising:
    a first RFID scanner located at garment provider facility and configured to:

associate an RFID tag with the garment as garment identifying information, and associate garment identifying information with a particular order for a customer; and a second RFID scanner located at a customer facility and configured to:

associate the RFID tag and associated garment identifying information with a particular location in the customer facility to confirm delivery of the garment as part of the particular order into the customer facility, and a particular employee of the customer.

* * * * *